United States Patent [19]
Nakatsukasa et al.

[11] Patent Number: 5,220,548
[45] Date of Patent: Jun. 15, 1993

[54] DISK CARTRIDGE STORAGE AND RETRIEVAL APPARATUS

[75] Inventors: Naoyuki Nakatsukasa; Katsufusa Tanaka; Toshihiro Tanaka, all of Amagasaki, Japan

[73] Assignee: Mitsubishi Denki Kabushiki Kaisha, Tokyo, Japan

[21] Appl. No.: 771,093

[22] Filed: Oct. 4, 1991

[30] Foreign Application Priority Data

Oct. 5, 1990 [JP] Japan .................. 2-266354

[51] Int. Cl.[5] .................. G11B 5/48; G11B 17/00
[52] U.S. Cl. .................. 369/36; 414/280
[58] Field of Search .................. 369/34, 35, 36, 37, 369/38, 39, 192; 360/92; 414/277, 280, 281, 282

[56] References Cited

U.S. PATENT DOCUMENTS

| | | | |
|---|---|---|---|
| 4,608,679 | 8/1986 | Rudy et al. | 369/36 |
| 4,614,474 | 9/1986 | Sudo | 369/36 X |
| 4,675,856 | 6/1987 | Rudy et al. | 369/36 |
| 4,685,095 | 8/1987 | Rudy et al. | 369/36 |
| 4,742,405 | 5/1988 | Teranishi | 360/92 |
| 4,815,055 | 3/1989 | Fago, Jr. | 369/36 |
| 4,815,056 | 3/1989 | Toi et al. | 369/36 |
| 4,827,463 | 5/1989 | Motoyoshi et al. | 369/36 |
| 4,853,916 | 8/1989 | Tomita | 369/36 |
| 4,903,252 | 2/1990 | Tanaka et al. | 369/36 |
| 4,912,575 | 3/1990 | Shiosaki | 360/92 X |
| 5,001,582 | 3/1991 | Numasaki | 369/36 X |
| 5,022,019 | 6/1991 | Motoyoshi et al. | 369/36 |
| 5,043,962 | 8/1991 | Wanger et al. | 369/36 |

FOREIGN PATENT DOCUMENTS

285866 6/1988 European Pat. Off. .
3817709 9/1988 Fed. Rep. of Germany .
61-258366 11/1986 Japan .

*Primary Examiner*—Edward P. Westin
*Assistant Examiner*—John R. Lee
*Attorney, Agent, or Firm*—Leydig, Voit & Mayer

[57] ABSTRACT

A disk cartridge storage and retrieval apparatus includes a stocker vertically disposed in a housing for storing a multitude of disk cartridges. An information recording and reproducing device is disposed in the housing in a vertically aligned relation with the stocker for recording and reproducing information onto or from a disk received in a disk cartridge. A guide shaft is vertically disposed in the housing and has an upper end thereof fixedly secured to an upper portion of the housing and a lower end thereof held free to move. A carrier mechanism is supported on the guide shaft for vertical movement therealong for transporting a disk cartridge between the stocker and the information recording and reproducing device. A vertical drive mechanism including a motor and an endless belt drives the carrier mechanism in a vertical direction along the guide shaft. Vibrations of the motor, which is installed on a housing base for driving the endless belt connected with the carrier mechanism, as well as vibrations transmitted to the housing base from external vibration sources, can be prevented from transmitting therefrom to the guide shaft, thereby ensuring the accurate operation of the carrier mechanism as well as avoiding resultant malfunctions and/or trouble thereof.

3 Claims, 6 Drawing Sheets

DISK CARTRIDGE STORAGE AND RETRIEVAL APPARATUS

BACKGROUND OF THE INVENTION

The present invention relates to a disk cartridge storage and retrieval apparatus for storing a multitude of disk cartridges each containing therein a disk as an information recording medium into a stocker, and retrieving a desired one of the cartridges from the stocker, loading it into an information recording and reproducing device, and returning, after reproduction of the information recorded on the disk contained therein or recordation onto the disk of pieces of information, it to a predetermined original location in the stocker.

conventionally, an example of such a disk cartridge storage and retrieval apparatus is known from Japanese Patent Laid-Open No. 61-258366. As perspectively illustrated in FIG. 7, the apparatus disclosed therein includes a box-shaped housing 101 in which a stocker 103 is installed for storing a multitude of disk cartridges 102 (hereinafter simply referred to as cartridges) each containing therein an information recording disk such as an optical disk, a magnetic disk, etc., in a horizontal attitude and in a vertically spaced parallel relation with respect to each other. Inside the housing 101 under the stocker 103, two information recording and reproducing devices 104, 104 for recording and reproducing information onto and from the disk in a cartridge 102 are horizontally disposed in a vertically spaced parallel relation with each other. Also, within the housing 101, there is disposed a carrier mechanism 105 which operates to selectively take out one of the cartridges 102 from the stocker 103, load it into one of the recording and reproducing devices 104, 104 and returns it to an original storage location in the stocker 103.

The carrier mechanism 105 includes a cartridge loading and unloading mechanism 106 for inserting and removing a cartridge 102 into or out of the recording and reproducing devices 104, a slide base 107 movable in the vertical direction while carrying the cartridge loading and unloading mechanism 106, and a drive mechanism 108 for vertically driving the slide base 107 to a level at which a desired one of the cartridges 102 is located in the stocker 103, and to another level at which an inlet opening of a desired one of the recording and reproducing devices 104, 104. The drive mechanism 108 comprises a pair of guide rails 109, 109 which are installed in the vertical direction in the housing 101 with their upper and lower ends fixedly secured to the top and the bottom of the housing 101, respectively, for guiding the vertical movement of the slide base 107, a pair of transmission belts 110, 110 connected with the slide base 107 and entrained around two pair of driven and drive pulleys (not shown) mounted on the top and bottom of the housing 101, and a motor 113 operatively connected with the drive pulleys for drivingly rotate them. Though not shown, the drive pulleys are mounted on the opposite ends of the rotating shaft of the motor 113, and the pulley shaft of each driven pulley is rotatably supported at its opposite ends by a pair of bearings each of which is mounted on the top plate 101a of the housing 101 with a shim being interposed therebetween for adjusting the vertical distance or clearance between the top plate 101a and the associated bearing. A rectangular-shaped balance weight 111 is secured to the transmission belt 110 at a location opposite to the slide base 107 with respect to the driven pulley. The balance weight 111 is vertically movable along a pair of vertically extending guide plates 112, 112, and it is supported on the opposite sides thereof by the guide plates 112, 112 through bearings such as linear bearings (not shown) so as to prevent any lateral swing or fluctuations thereof during its vertical movement. The guide rails 109, 109 for guiding the vertical motion of the slide base 107 are rigidly secured at an upper end and a lower end thereof to the top plate 101a and the bottom base 101b, respectively.

The apparatus further includes, though not shown in the drawings, a cartridge supply and discharge mechanism for supplying a cartridge 102 from the exterior to the apparatus and discharging it therefrom, and a control means for controlling the overall operation of the apparatus.

The operation of the above-described embodiment will now be described in detail. First, it should be noted that it is the basic operation of the apparatus to selectively take a desired cartridge 102 out of the stocker 103 and return a cartridge 102 once taken out to its original position in the stocker 103. For example, the operation of the apparatus of loading a cartridge 102 into one of the recording/reproducing devices 104, 104 will be described first.

When an operator sends to the unillustrated control means a command for taking an appropriate cartridge 102 out of the stocker 103 and load it into one of the recording/reproducing devices 104, the control means operates to start the motor 113 through the intermediary of an unillustrated controller for vertically moving the slide base 107. Thus, the cartridge loading and unloading mechanism 106 is driven by the motor 113 to upwardly move to a position in which the cartridge insertion opening 106a in the cartridge loading and unloading mechanism 106 is placed in confrontation with a desired one of the cartridges 102 stored in the stocker 103. Subsequently, when the slide base 107 has been moved to the desired position in this manner, the motor 113 is stopped by the control means. In this state, the cartridge loading and unloading mechanism 106 is first driven to horizontally move forwards or in its extending direction so as to grasp the desired cartridge 102 in the stocker 103, and then move back in a retracting direction so that the cartridge 102 is thereby taken out of the stocker 103. Once the cartridge 102 has fully come out of the stocker 103, the motor 113 is again energized to move, through the transmission belts 110, 110, the slide base 107 in the downward direction along the guide rails 109, 109 to a position confronting the inlet opening 104a in the one of the recording/reproducing devices 104, 104. At this time, the cartridge loading and unloading mechanism 106 may be caused to rotate a half revolution around the support shaft with respect to the slide base 107 so that it is turned upside down. Thereafter, the cartridge loading and unloading mechanism 106 is driven to extend toward the inlet opening 104a of the one recording/reproducing device 104 so as to insert the cartridge 102 thereinto, and after the cartridge 102 has been fully inserted into the inlet opening 104a, it is released from the cartridge loading and unloading mechanism 106, which is then retracted to a predetermined position. Likewise, in order to take a cartridge 102 out of one of the recording/reproducing devices 104, 104 and return it to the predetermined original position in the stocker 103, the above-described operations are performed in the reverse sequence.

With the above-described known disk cartridge storage and retrieval apparatus, the guide rails 109, 109 for guiding the vertical motion of the slide base 107 are rigidly secured at the upper and lower ends thereof to the top plate 101a and the bottom base 101b, respectively, of the housing 101 so that vibrations of the motor 113, which is installed on the bottom base 101b and generates relatively great power, occurring upon its starting as well as during the operation thereof, are liable to be directly transmitted from the bottom base 101b to the guide rails 109, 109, and thence to the slide base 107 and the cartridge loading and unloading mechanism 106 which are supported on the guide rails 109, 109, thus adversely affecting the accurate operations thereof and causing, in an extreme case, malfunctions and damage thereof.

Further, since the pulley shaft of the driven pulley is directly supported by a pair of bearings which are fixedly mounted on the top plate 101a of the housing 101, adjustment of the tension of the transmission belts 110, 110 is performed by changing the thickness of a shim disposed between each of the bearings and the top plate 101a, e.g., by replacing a shim with another appropriate one having a different thickness. As a result, the tension adjustment is time consuming and inefficient.

Moreover, since the balance weight 111 is supported at its opposite sides by the pair of guide plates 112, 112 through bearings such as linear bearings, which are relatively expensive, so as to be guided in its vertical movement, the cost of manufacture of the entire apparatus becomes high due in part to the use of the relatively expensive bearings.

SUMMARY OF THE INVENTION

In view of the above, the present invention is intended to obviate the above-described problems of the known disk cartridge storage and retrieval apparatus.

An object of the present invention is to provide an improved disk cartridge storage and retrieval apparatus in which vibrations of a motor, which is installed on a housing base for driving a carrier mechanism, as well as vibrations applied to the housing base from external vibration sources can be prevented from transmitting therefrom to a guide shaft which guides the vertical movement of the carrier mechanism, thereby ensuring the accurate operation of the carrier mechanism as well as avoiding resultant malfunctions and/or trouble thereof.

Another object of the present invention is to provide an improved disk cartridge storage and retrieval apparatus in which the vertical motion of a balance weight, which is connected with one side of an endless belt connected at the other side thereof to the carrier mechanism, can be guided by an inexpensive and simple mechanism without employing expensive bearings.

A further object of the present invention is to provide an improved disk cartridge storage and retrieval apparatus in which the tension of the endless belt for moving the carrier mechanism in a vertical direction can be readily adjusted in a easy and simple manner.

According to the present invention, there is provided a disk cartridge storage and retrieval apparatus comprising: a stocker vertically disposed in a housing for storing a multitude of disk cartridges; an information recording and reproducing device disposed in the housing in a vertically aligned relation with the stocker for recording and reproducing information onto or from a disk received in a disk cartridge; a guide shaft vertically disposed in the housing and having an upper end fixedly secured to an upper portion of the housing and a lower end held yet free to move; a carrier mechanism supported on the guide shaft for vertical movement therealong for transporting a disk cartridge between the stocker and the information recording and reproducing device; and a vertical drive mechanism for driving the carrier mechanism in a vertical direction along the guide shaft.

Preferably, the vertical drive mechanism comprises: a pair of drive and driven pulleys each having a pulley shaft and disposed at a lower portion and an upper portion, respectively, of the housing; an endless belt trained around the drive and driven pulleys and connected to the carrier mechanism; drive means operatively connected with the drive pulley for rotating the drive pulley; and a balance weight connected with the endless belt at a location opposite the carrier mechanism with respect to the drive and driven pulleys. The balance weight is movable in a vertical direction along a guide means which is disposed vertically in the housing, the balance weight having a slide means slidably engaged with the guide means for vertical movement relative thereto.

The apparatus may further includes: a pulley holder fixedly secured to an upper portion of the housing and having a pair of spaced side plates which have a pair of vertically extending elongated apertures formed therein; a pair of bearings mounted on an upper portion of the housing for supporting the pulley shaft of the upper pulley; and position adjusting means for vertically adjusting the mounting position of the bearings relative to the housing. The pulley shaft of the upper pulley has opposite ends thereof extending through the vertical elongated apertures in the opposite side plates of the pulley holder so as to be rotatably supported by the bearings.

The above and other objects, features and advantages of the present invention will become apparent from the following detailed description of a preferred embodiment of the invention taken in conjunction with the accompanying drawings.

DESCRIPTION OF THE PREFERRED EMBODIMENT

A preferred embodiment of the present invention will now be described in detail with reference to the accompanying drawings.

Figure 1:
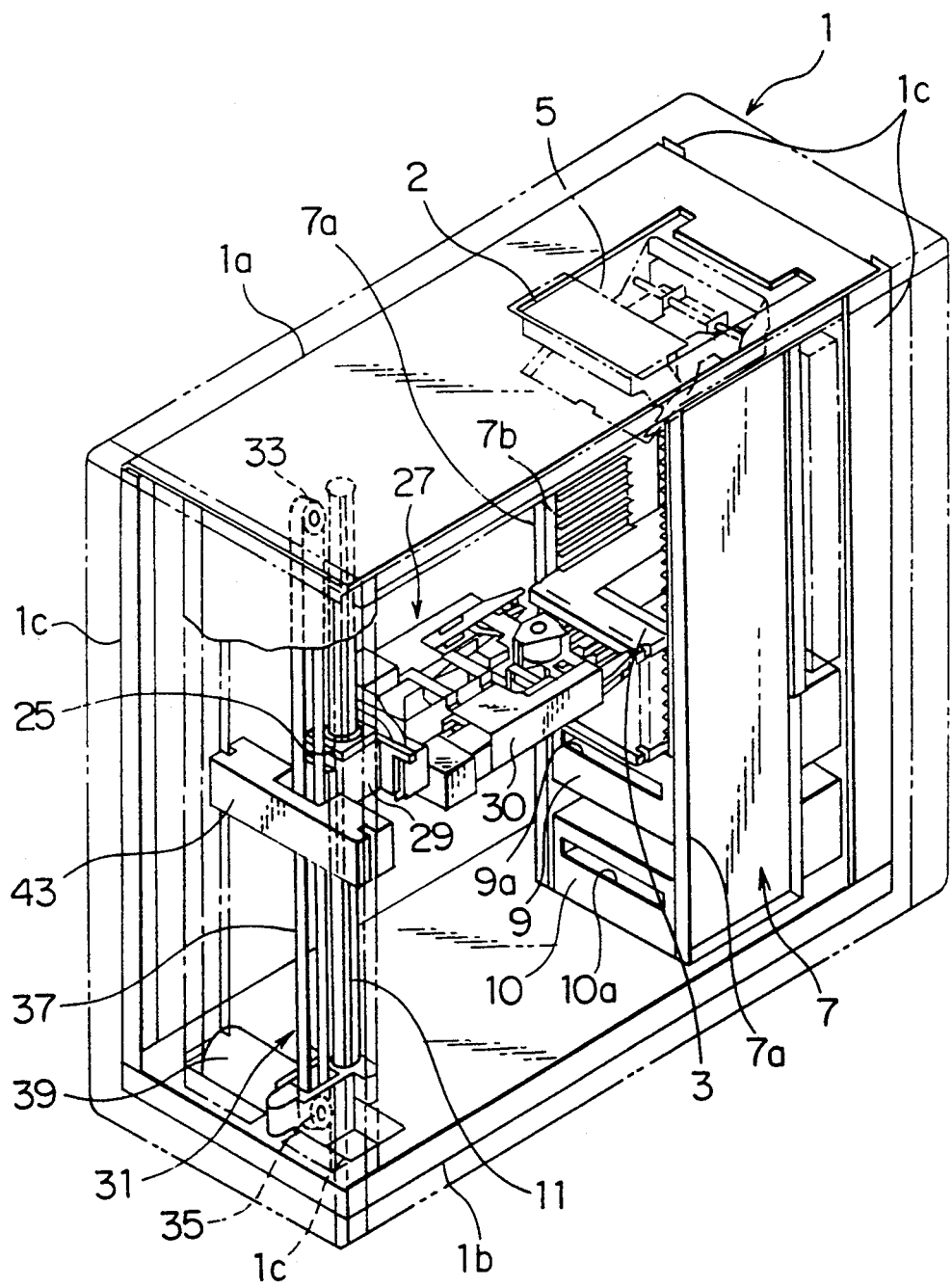
FIG. 1 is a perspective view of a disk cartridge storage and retrieval apparatus in accordance with the present invention.

Referring first to FIG. 1, there is perspectively shown the general construction of a disk cartridge storage and retrieval apparatus in accordance with the present invention. The apparatus illustrated includes a box-shaped housing 1 having a rectangular-shaped top plate 1a and a similarly shaped bottom base 1b which are disposed in a spaced parallel relation with respect to each other and connected at their four corners with each other by four angle members 1c each having an L-shaped cross section so as to form a rigid hexagonal frame, of which five surfaces except for the bottom surface are covered by five panels so as to provide a closed hexagonal box. The top plate 1a of the housing 1 has an opening 2 formed therethrough for the supply and discharge of a disk cartridge 3. Inside the housing 1 just below the opening 2, a cartridge feeder 5 is disposed for supplying and discharging a disk cartridge 3 to or form the housing 1. Also, inside the housing 1 below the cartridge feeder 5, a stocker 7 in the form of a rack is installed on the bottom base 1b for neatly storing a multitude of cartridges 3 in a horizontal manner and in a vertically spaced and aligned parallel relation with each other. Two recording and reproducing devices 9, 10 including disk drives for recording and reproducing information on a disk such as a magnetic disk, an optical disk and the like are accommodated one over the other in the stocker 7 at the bottom thereof in a horizontal manner. The recording and reproducing devices 9, 10 are removably attached to a pair of opposed side plates 7a, 7a by appropriate fastening means such as screws (not shown) in a manner so that they can be readily detached therefrom by loosening the fastening means to rearwardly slide them along guide rails (not shown) on the inside surfaces of the side plates 7a, 7a for removal thereof. Each of the recording and reproducing devices 9, 10, when fixed in place to the stocker 7, has a front panel provided with a cartridge insertion and discharge opening 10a (hereinafter simply referred to as an inlet opening) which is disposed substantially in vertical alignment with the front end surface of the stocker 7. The number of the recording and reproducing devices 9, 10 disposed in the stocker 7 may be one or more than two.

Figure 4:
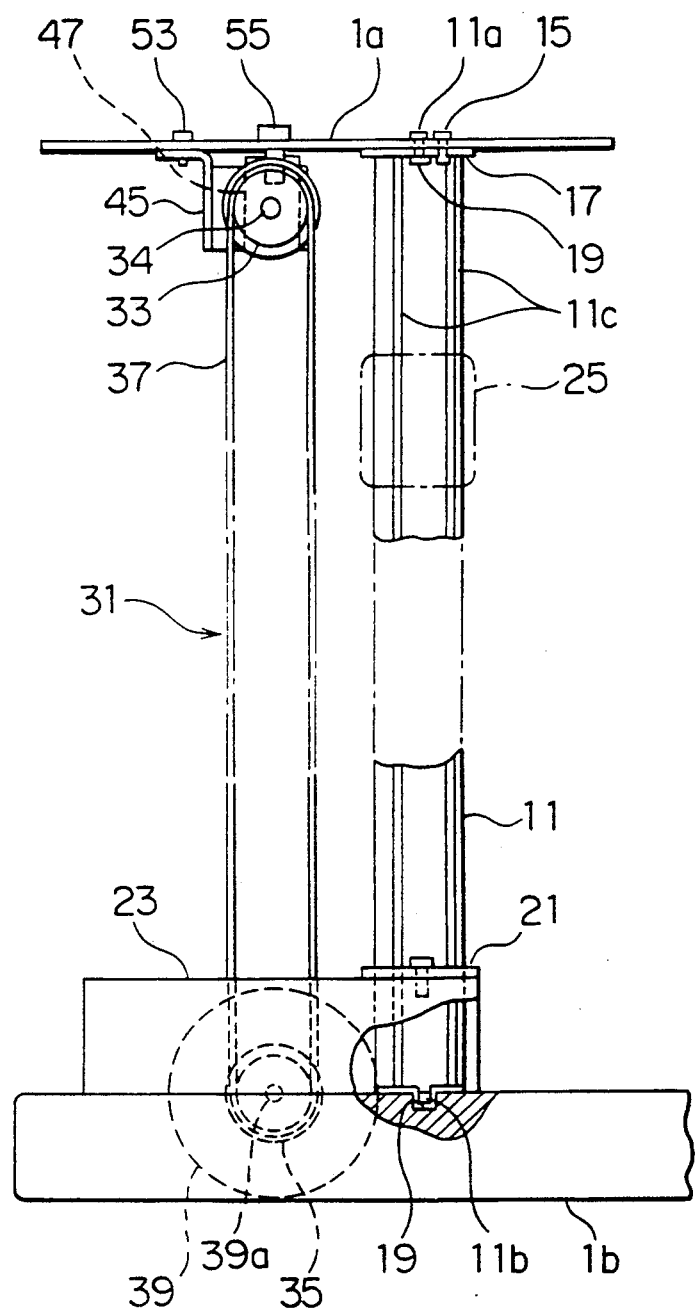
FIG. 4 is a side elevation showing the mounting of a vertical drive mechanism and the guide shaft to a housing.
Figure 5:
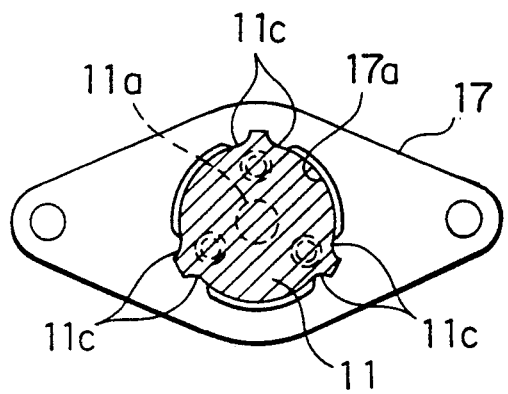
FIG. 5 is a plan view showing the mounting of a rotation preventing plate to the guide shaft.

As clearly illustrated in FIG. 4, the guide shaft 11 in the housing 1 extends in the vertical direction and is provided at its top end with an upper projection 11a which is to be fitted into an engagement bore in the top plate 1a of the housing 1 with the upper end surface thereof being abutted against and fixedly secured to the top plate 1a by bolts 15. Further, as shown in FIG. 5, an upper rotation preventive plate 17 having an aperture 17a of substantially the same cross-sectional configuration as that of the guide shaft 11 is fitted over the guide shaft 11 and fixedly secured to the top plate 1a by bolts 18 so as to prevent the rotation of the guide shaft 11. Also, the guide shaft 11 is provided at its bottom end with a lower projection 11b which is fitted into an engagement bore 19 in the bottom base 1b. A lower rotation preventive plate 21 having an aperture of the same cross-sectional configuration as that the guide shaft 11 is fitted over the guide shaft 11 and fixedly secured by bolts 22 to a motor mount 23 which is installed on the bottom base 1b. The engagement bore 19 is designed to have a diameter and a depth slightly greater than the diameter and the length of the lower projection 11b of the guide shaft 11. The aperture in the lower rotation preventive plate 21 is also designed to have a shape slightly greater than the cross-sectional configuration of the guide shaft 11. As a result, the lower end of the guide shaft 11 is prevented from rotation by means of the lower rotation preventive plate 21 but it is permitted to play or move in the vertical direction. In this manner, the guide shaft 11 is suspended at its upper end from the top plate 1a with its lower end being freely movable in the vertical direction, so that the transmission of vibrations from the bottom base 1b toward the guide shaft 11 are effectively prevented.

Figure 2:
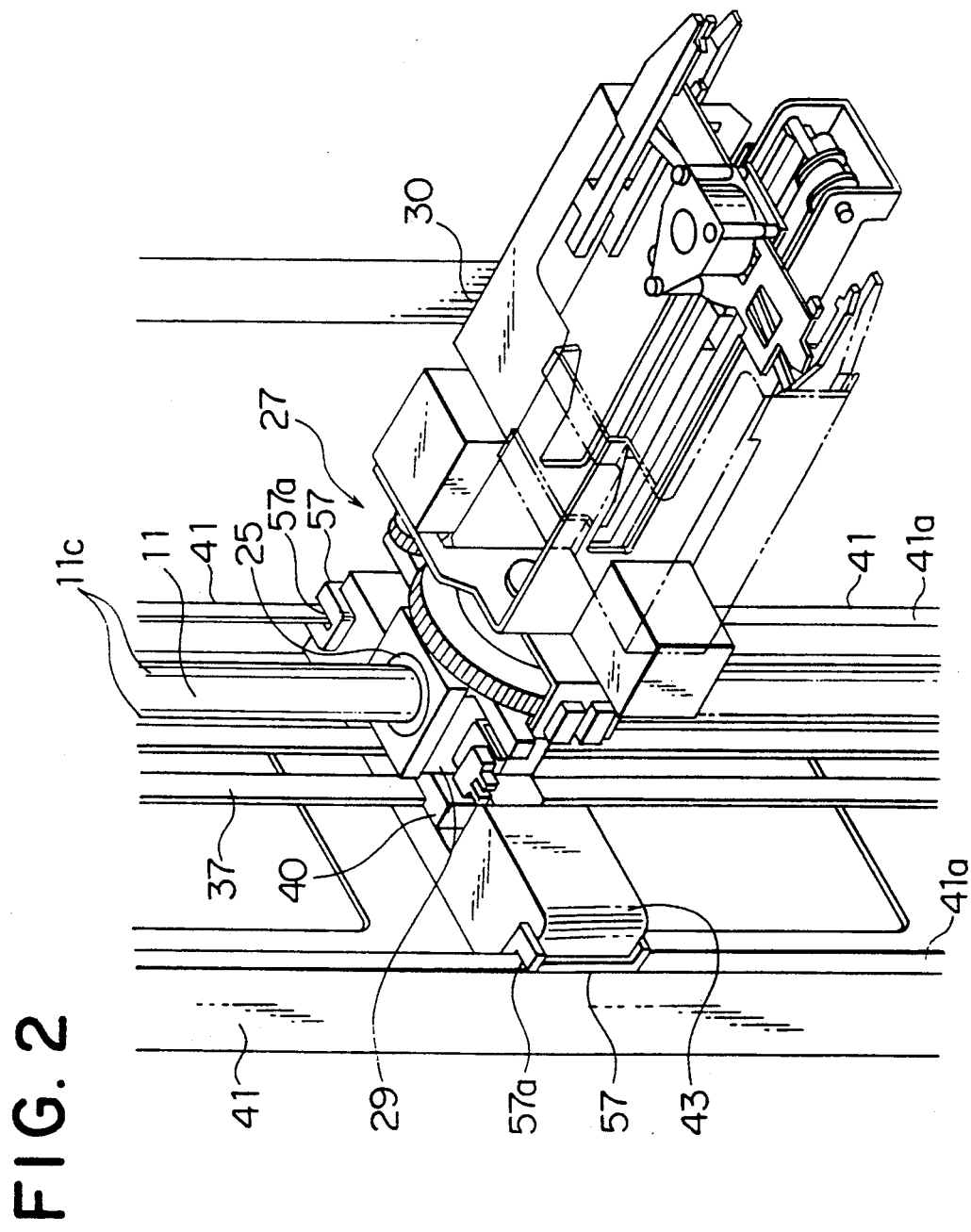
FIG. 2 is a perspective view showing the mounting of a carrier mechanism of the disk cartridge storage and retrieval apparatus of FIG. 1 to a guide shaft as well as the mounting of a balance weight to guide plates.
Figure 3:
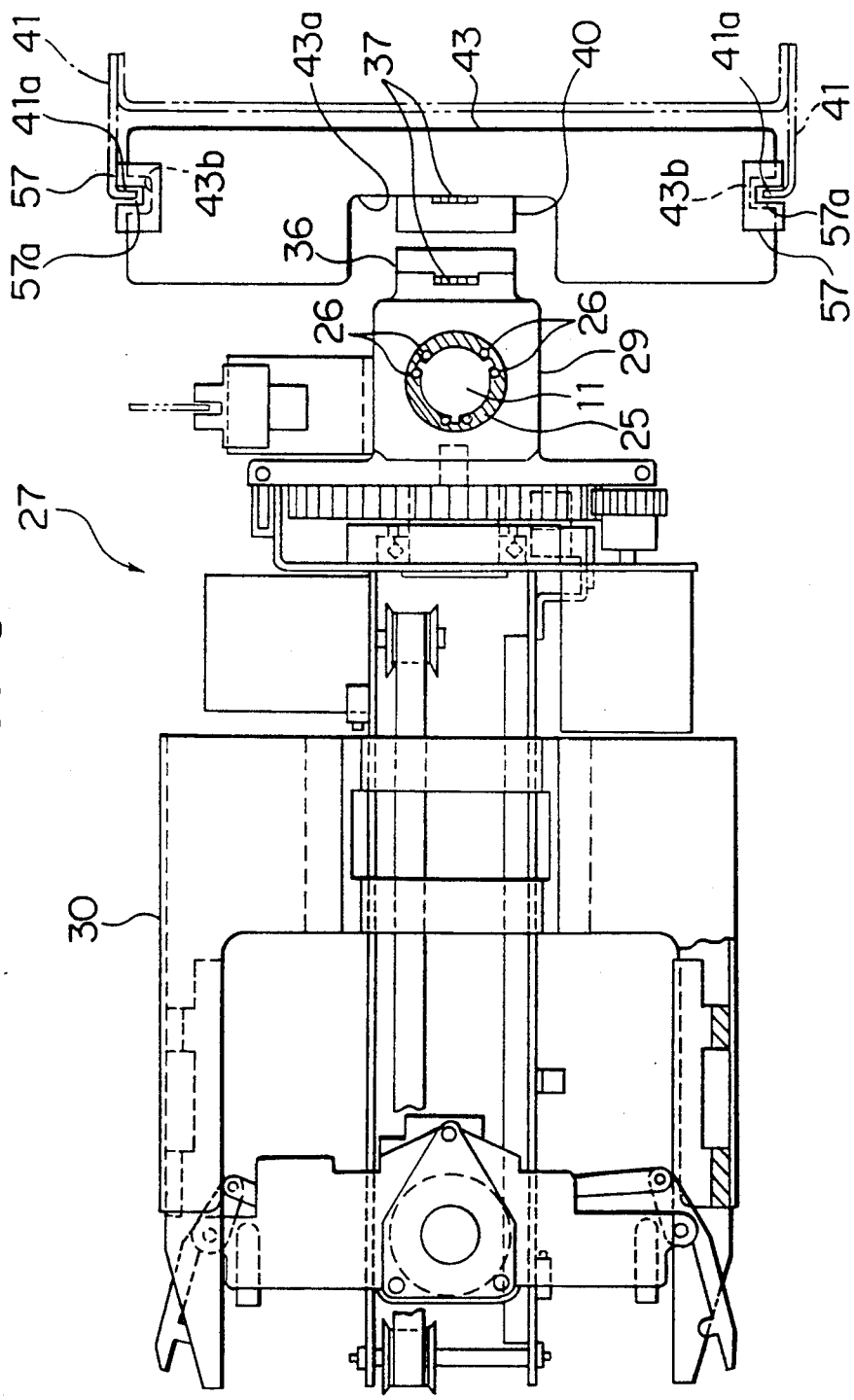
FIG. 3 is a plan view of the disk cartridge storage and retrieval apparatus of FIG. 1.

As can be seen from FIGS. 2, 3 and 5, the guide shaft 11 is in the form of a ball spline having a plurality of rows of longitudinally extending rectilinear ball guide grooves 11c formed on the outer peripheral surface thereof. As clearly shown in FIG. 3, a ball nut 25 is fitted over the ball spline 11 with balls 26 disposed therebetween so that the ball nut 25 can slidingly move along the ball spline 11 while the balls 26 rollingly circulate along the ball guide grooves 11c on the surface of the ball spline 11. As a result, the ball nut 25 is prevented from rotation during sliding movements thereof relative to the guide shaft 11.

A carrier mechanism 27 is supported on the guide shaft 11 through the ball nut 25 for transporting between the cartridge loading and unloading mechanism 5, the stocker 7 and the recording and reproducing devices 9, 10. The carrier mechanism 27 are caused to move along the guide shaft 11 by means of a vertical drive mechanism 31. The carrier mechanism 27 comprises a slide base 29 attached to the ball nut 25 and supported on the guide shaft 11 through the ball nut 25 for vertical movement therealong, and a cartridge loading and unloading mechanism 30 rotatably supported on the slide base 29 and being movable back and forth in a horizontal direction relative to the cartridge loading and unloading mechanism 5, the stocker 7 and the recording and reproducing devices 9, 10 for transporting a cartridge 3 therebetween.

As shown in FIG. 4, the vertical drive mechanism 31 comprises a pair of driven and drive pulleys 33, 35 disposed at the upper and lower portions, respectively, of the housing 1, an endless belt 37 in the form of a timing belt trained around the driven and drive pulleys 33, 35 and connected to the slide base 29 through an attachment 36, a drive means 39 in the form of a motor connected to the drive pulley 35 for driving it to rotate, and a balance weight 43 connected with the endless belt 37 through an attachment 40 on the side opposite the slide base 29 with respect to the driven and drive pulleys 33, 35, the balance weight 43 being movable in a vertical direction along a pair of guide plates 41 which are disposed in the housing 1 to extend in the vertical direction.

Figure 6:
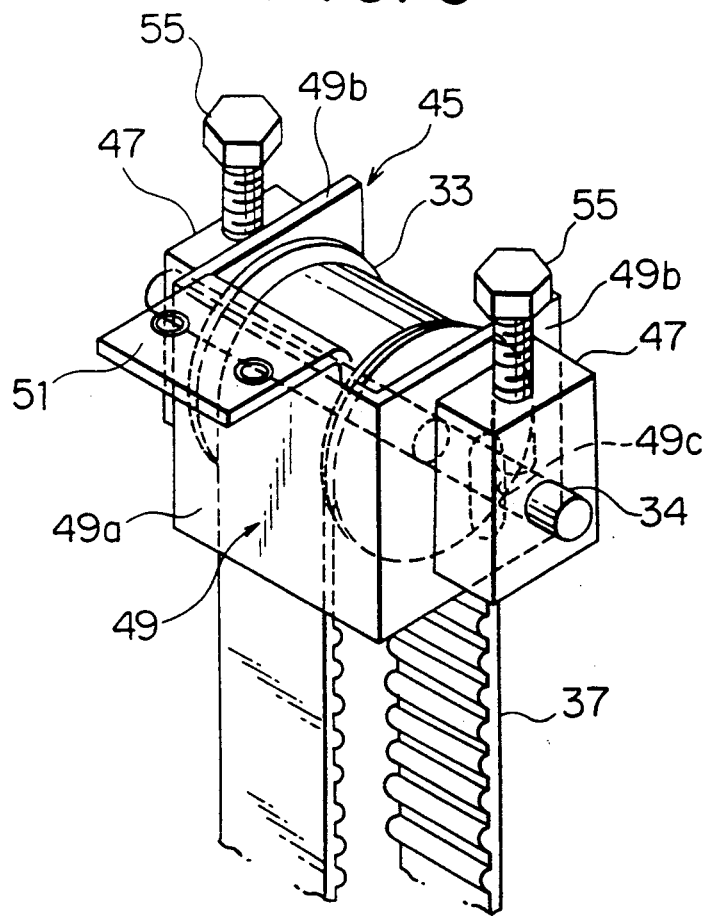
FIG. 6 is a perspective view showing the mounting state of an upper pulley.
Figure 7:
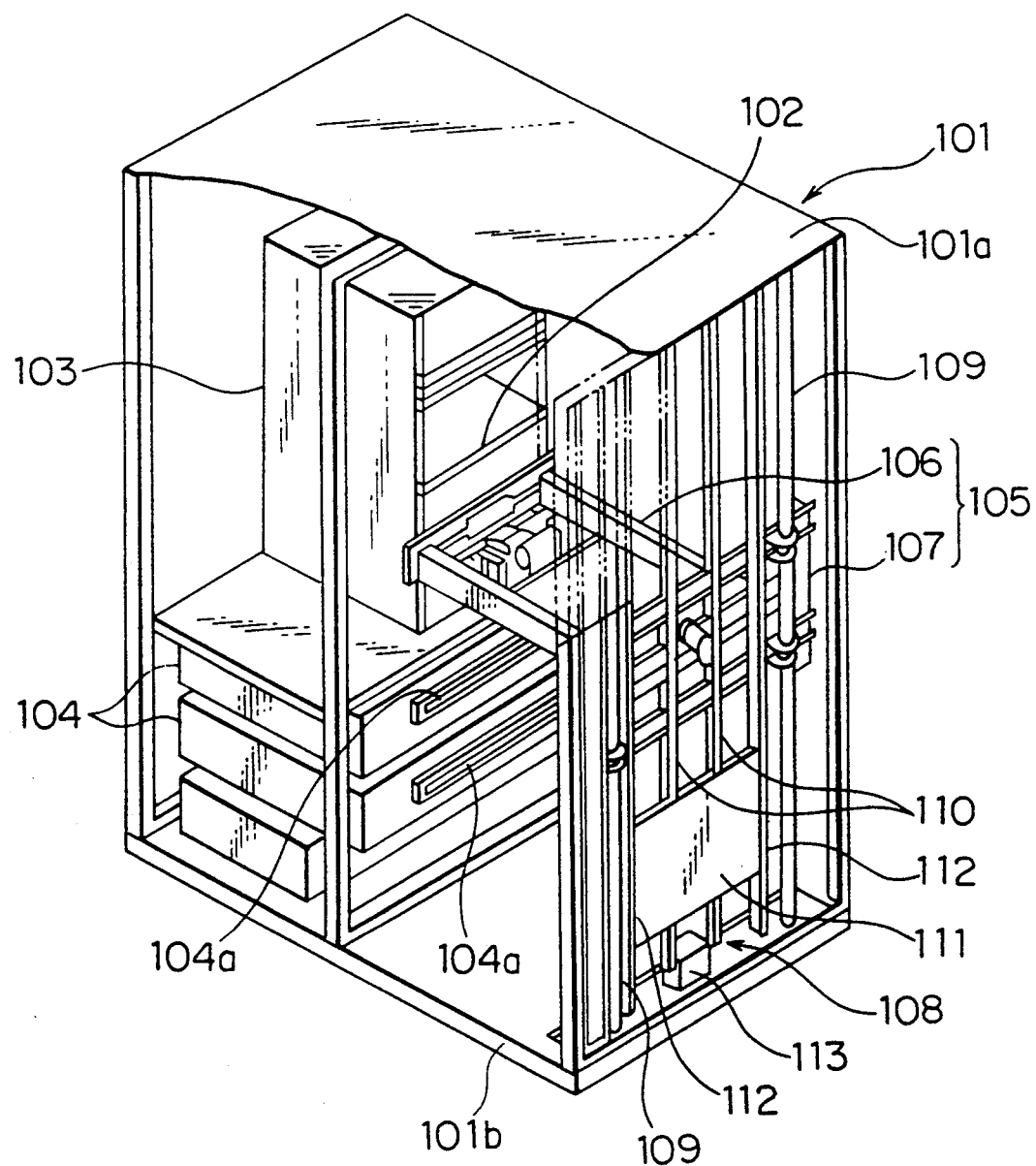
FIG. 7 is a perspective view of a conventional disk cartridge storage and retrieval apparatus.

The drive pulley 35 is fixedly mounted on one end of a rotation shaft 39a of the motor 39, whereas the driven pulley 33 is mounted on the upper plate 1a of the housing 1 through a pulley holder 45 and a pair of bearings 47, 47 for vertical position adjustment. As illustrated in FIG. 6, the pulley holder 45 includes a holder body 49 of a generally C-shaped cross section formed of a metal plate or the like, the holder body 49 comprising a central plate 49a, a pair of side plates 49b, 49b integrally formed with the central plate 49a on the opposite sides thereof, and a mounting member 51 integrally formed with the holder body 49 and extending from one end edge of the central plate 49a substantially at right angles relative thereto. The mounting member 51 is fixedly attached to the upper plate 1a of the housing 1 through an appropriate fastening means 53 such as bolts or the like (see FIG. 4). Each of the side plates 49b, 49b of the holder body 49 has a vertically elongated aperture 49c formed therethrough substantially at the center thereof. On the outer side of each side plate 49b, there is disposed a bearing 47 which is mounted on the upper plate 1a of the housing 1 through a position adjusting means 55 in the form of bolts so that the vertical mounting position of the bearing 47 with respect to the housing upper plate 1a can properly be adjusted by turning the bolts 55 in one or the other direction. The driven pulley 33 has a pulley shaft 34 which extends at its opposite ends through the elongated apertures 49c, 49c in the opposite side plates 49b, 49b of the holder body 49 so as to be rotatably supported by the bearings 47, 47. Thus, when the bolts 55, 55 are turned to move the bearings in the vertical direction, the pulley shaft 34 is accordingly caused to vertically move in and along the elongated apertures 49c, 49c in the holder side plates 49b, 49b so that the driven pulley 33 is thereby moved in the vertical direction with respect to the housing upper plate 1a to adjust the tension of the endless belt 37. As a result, any slack in the endless belt 37 generated upon assembly of the apparatus or during its use for an extended period of time can readily be removed or adjusted to an appropriate level in this manner.

The balance weight 43 has a mass substantially equal to a total mass of the slide base 29 and the cartridge loading and unloading mechanism 30 supported thereby for reducing the load applied to the motor 39 during vertical movements of the slide base 29. The balance weight 43 of substantially a rectangular configuration in plan is formed at its center and opposite sides with a longitudinally extending C-shaped central groove 43a and a pair of longitudinally extending C-shaped side grooves 43b, 43b, respectively. The endless belt 37 is fixedly connected with the balance weight 43 through the attachment 40 at the central groove 43a thereof. A pair of sliders 57, 57 formed of resin are fixedly fitted into the side grooves 43b, 43b, respectively, in the balance weight 43. Each of the sliders 57, 57 has a longitudinally extending guide groove 57a formed at the center thereof. The guide plates 41, 41 each having an L-shaped cross section are disposed in a vertical direction on the opposite sides of the balance weight 43 inside the housing 1 and fixedly secured at their upper and lower ends to the top plate 1a and the bottom base 1b. The vertical guide plates 41, 41 have vertically extending flange portions 41a, 41a bent at right angles from one side edge thereof, the flange portions 41a, 41a being fitted into the corresponding vertical guide grooves 57a, 57a in the sliders 57, 57 for vertical sliding movement so that during vertical movements of the balance weight 43, the sliders 57, 57 slide up and down along the flanges 41a, 41a of the guide plates 41, 41 to guide the balance weight 43. In this connection, it is to be noted that the vertical groove 57a in each slider 57 has a depth greater than the width of each flange 41a, so that the edge surfaces of each slider 57 on the opposite sides of the guide groove 57a can be placed in abutting engagement with the inner surface of the corresponding L-shaped guide plate. With this arrangement, the tip portion of the flange 41a of each guide plate 41 is prevented from localized or non-uniform abutment with the inner surfaces at the vertical groove 57a of the corresponding slider 57 upon sliding movement thereof, thus avoiding locally damaging these portions in sliding engagement with each other in an effective manner.

The operation of the above-described embodiment will now be described in detail. First, when a command is supplied to an unillustrated control unit incorporated in the apparatus such that a desired cartridge 3 stored in the stocker 7 is selected and loaded into one of the recording and reproducing devices 9, 10, the control unit energizes the motor 39 of the vertical drive mechanism 31 to rotate the drive pulley 35. In accordance with the rotation of the drive pulley 35, the endless belt 37 is thereby caused to rotate and move around the drive and driven pulleys 35, 33 so that the slide base 29 connected to the endless belt 37 is moved in a vertical direction along the guide shaft 11 through the ball nut 25 to a height corresponding to the vertical position of the desired cartridge 3 stored in the stocker 7 while maintaining the cartridge loading and unloading mechanism 30 in a horizontal attitude. When the slide base 29 has been moved to the desired vertical location in this manner, the motor 39 is stopped. Then, the cartridge loading and unloading mechanism 30 is extended toward the stocker 7 in a horizontal direction so that it can grip the desired cartridge 3 in the stocker 7. After having gripped the cartridge 3 in this manner, the cartridge loading and unloading mechanism 30 is retracted toward the guide shaft 11 to take the cartridge 3 out of the stocker 7. When the cartridge 3 has been completely removed from the stocker 7, the motor 39 is again energized to downwardly move the slide base 29 along the guide shaft 11 through the action of the drive pulley 35 and the endless belt 37 to a height or vertical position corresponding to one of the inlet openings 9a, 10a of the recording and reproducing devices 9, 10. On this occasion, the cartridge loading and unloading mechanism 30 can be rotated, as required, 180 degrees around the support shaft with respect to the slide base 29 so as to turn the cartridge 3 upside down. Thereafter, the cartridge loading and unloading mechanism 30 is extended to load the cartridge 3 into the inlet opening 9a or 10a of the recording and reproducing device 9 or 10. When the loading of the cartridge 3 has finished, the cartridge loading and unloading mechanism 30 is controlled to release the cartridge 3 and then retract to a predetermined position. In addition, in order to take a cartridge 3 out of the recording and reproducing device 9 or 10 and return it to a prescribed location in the stocker 7, the above-described operation is reversed.

On the other hand, the guide shaft 11 is suspended from the top plate 1a of the housing 1 with the lower end thereof being held free to move against the bottom base 1b of the housing 1. With this arrangement, vibrations caused by the operation of the motor 39 installed on the bottom base 1b of the housing 1 or other external vibrations applied to the bottom base 1b are prevented from being directly transmitted therefrom to the guide shaft 11.

Moreover, during vertical movements of the slide base 29, the balance weight 43, which is connected with the endless belt 37 at a location on the opposite side of the slide base 29 with respect to the drive and driven pulleys 35, 33, is moved along the pair of guide plates 41, 41 disposed on the opposite sides of the balance weight 43 in a direction opposite the direction in which the slide base 29 moves. As a result, the motor 39 for vertically driving the slide base 29 can be a small one having relatively small output power. In this connection, vertical motion of the balance weight 43 is guided by engagement of the vertically extending flanges 41a, 41a of the guide plates 41, 41 with the corresponding guide grooves 57a, 57a in the sliders 57, 57 formed of resin which are attached to the opposite sides of the balance weight 43. Accordingly, the balance weight 43 is prevented from being vibrated during vertical movements thereof, and hence there is no fear that the slide base 29 and the cartridge loading and unloading mechanism 30 are caused to vibrate or fluctuate due to vibrations of the balance weight 43.

Furthermore, when the tension of the endless belt 37 is to be adjusted upon assembly of the apparatus or after an extended period of use thereof, the mounting bolts 55, 55 for the bearings 47, 47 are turned to move the mounting positions thereof with respect to the top plate 1a of the housing 1 in a vertical direction so that the vertical position of the pulley shaft 34 supported by the bearings 47, 47 is thereby changed to properly adjust the distance between the drive and driven pulleys 35, 33. As a consequence, the tension of the endless belt 37 can be adjusted in quite an easy and simple manner.

What is claimed is:

1. A disk cartridge storage and retrieval apparatus comprising:
   a stocker vertically disposed in a housing for storing a multitude of disk cartridges;
   an information recording and reproducing device disposed in the housing in a vertically aligned relation with the stocker for recording and reproducing information onto or from a disk received in a disk cartridge;
   a guide shaft vertically disposed in the housing and having an upper end fixedly secured to an upper portion of the housing and a lower end held yet free to move;
   a carrier mechanism supported on the guide shaft for vertical movement therealong for transporting a disk cartridge between the stocker and the information recording and reproducing device; and
   a vertical drive mechanism for driving the carrier mechanism in a vertical direction along the guide shaft.

2. A disk cartridge storage and retrieval apparatus according to claim 1, wherein the vertical drive mechanism comprises:
   drive and driven pulleys each having a pulley shaft and disposed at a lower portion and an upper portion, respectively, of the housing;
   an endless belt trained around the drive and driven pulleys and connected to the carrier mechanism;
   drive means operatively connected with the drive pulley for rotating the drive pulley;
   a balance weight connected with the endless belt at a location opposite the carrier mechanism with respect to the drive and driven pulleys, the balance weight being movable in a vertical direction along a guide means disposed vertically in the housing, the balance weight having a slide means slidably engaged with the guide means for vertical movement relative to the guide means.

3. A disk cartridge storage and retrieval apparatus according to claim 2, further comprising:
   a pulley holder fixedly secured to an upper portion of the housing and having a pair of spaced side plates which have a pair of vertically extending elongated apertures formed therein;
   a pair of bearings mounted on an upper portion of the housing for supporting the pulley shaft of the upper pulley; and
   position adjusting means for vertically adjusting the mounting position of the bearings relative to the housing;
   wherein the pulley shaft of the upper pulley has opposite ends thereof extending through the vertical elongated apertures in the opposite side plates of the pulley holder so as to be rotatably supported by the bearings.

* * * * *